United States Patent
Császár et al.

(10) Patent No.: US 8,503,303 B2
(45) Date of Patent: Aug. 6, 2013

(54) CONGESTION HANDLING IN MULTICAST NETWORKS

(75) Inventors: András Császár, Budapest (HU); Attila Báder, Paty (HU); Csaba Antal, Kiskunlacháza (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 257 days.

(21) Appl. No.: 12/989,705

(22) PCT Filed: Apr. 25, 2008

(86) PCT No.: PCT/EP2008/003381
§ 371 (c)(1),
(2), (4) Date: Oct. 26, 2010

(87) PCT Pub. No.: WO2009/129828
PCT Pub. Date: Oct. 29, 2009

(65) Prior Publication Data
US 2011/0044171 A1 Feb. 24, 2011

(51) Int. Cl.
*H04L 12/26* (2006.01)
*H04L 12/56* (2006.01)
(52) U.S. Cl.
USPC .......................................... 370/235; 370/236
(58) Field of Classification Search
USPC ............................................... 370/235, 236
See application file for complete search history.

(56) References Cited

U.S. PATENT DOCUMENTS

| | | | |
|---|---|---|---|
| 6,269,085 B1 * | 7/2001 | Provino et al. | 370/256 |
| 7,668,089 B1 * | 2/2010 | Srinivasan et al. | 370/230 |
| 2002/0194362 A1 * | 12/2002 | Rawlins et al. | 709/235 |

OTHER PUBLICATIONS

Andras Csaszar et al: "A Practical Method for the Efficient Resolution of Congestion in an On-path Reduced-State Signalling Environment" Quality of Service—IWQOS 2005 Lecture Notes in Computer Scence;;LNCS, Springer-Verlag, BE. vol. 3552, Jan. 1, 2005, XP019011108.
Westberg L et al. "LC~PCN: The Load Control PCN Solution; draft-westberg-pcn-load-control-03.txt" IETF Standard-Working-Draft . Internet Engineering Task Force, IETF, CH, No. 3, Feb. 25, 2008, XP015054754.
Vicisano, L et al. TCP-Like Congestion Control for Layered Multicast Data Transfer. INFOCOM '98, vol. 3, Mar. 1996.

* cited by examiner

*Primary Examiner* — Min Jung (57) ABSTRACT

The invention relates to techniques for traffic handling in congestion situations in a point-to-multipoint ('PTM') enabled network. A method embodiment of the inventive technique is performed in an egress node of the network and comprises the steps of detecting marked packets, the marking being indicative of a congestion situation in a core node of the PTM-enabled network; selecting, based on the detected markings, a particular PTM flow from one or more PTM flows passing the egress node for termination; and indicating the selected PTM flow in an upstream direction of the selected flow.

13 Claims, 3 Drawing Sheets

Traffic handling in egress node

302 — Detect marked packets, the marking being indicative of a congestion situation in a core node of a PTM-enabled network 304 — Select a particular PTM flow from one or more PTM flows passing the egress node for termination based on the detected markings 306 — Indicate the selected PTM flow in an upstream direction of the selected flow

Fig. 3

CONGESTION HANDLING IN MULTICAST NETWORKS

TECHNICAL FIELD

The invention relates to a technique for traffic handling in congestion situations in point-to-multipoint ("PTM") enabled networks.

BACKGROUND

PTM transmissions, for example multicast or broadcast transmissions in IP (Internet Protocol) networks, are employed for the distribution of data from a source to a plurality of receivers. In a typical scenario, a multimedia data stream comprising audio data, video data or a combination thereof is distributed to the audience within the framework of a TV service, video-on-demand service, news or podcast service, etc. PTM-enabled data transport networks may be based on the IP protocol suite. The IP technology is widely employed in today's communication networks comprising not only the Internet, but also fixed and mobile telecommunication networks such as UMTS networks.

A, possibly large, fraction of all the data transported over a communication network may be classified as "Best Effort" traffic, i.e. the data packets are transported with the currently available forwarding capacities in the network nodes (insofar as data transport networks are concerned, the terms 'node' and 'router' may be used interchangeably herein). Forwarding delays and packet losses occur in case of overload situations in a node. Each packet suffers its individual delay (jitter), such that packets sent in a particular order by the source will arrive disordered at the destination. However, some applications require a minimum Quality of Service (QoS). Consider for example a real-time application such as a TV stream: While a small amount of packet loss will be tolerable, the packet delay (more precisely, the jitter) has to be limited to lie below a pre-defined maximum value.

From the point of view of the network, in order to be able to provide a better-than-best-effort QoS, some form of traffic management (traffic handling) is required. The required transmission resources need to be available in the transport nodes. More particularly, a congestion situation in a node typically may occur in case a forwarding capacity of an interface connecting or linking the node to the other nodes along a data path is exceeded. For example, an incoming or outgoing queue of an interface may be filled up to a pre-defined limit (a higher load would lead to an intolerable delay) or may already be filled up to its total capacity (a higher load would lead to packet loss). Traffic handling has to ensure that such overload situations (congestion situations) are avoided or at least resolved on short timescales (at least for data connections or data streams with QoS better than Best Effort).

Various techniques are known to provide a predetermined QoS for point-to-point ("PIP") connections such as unicast connections in IP networks. One class of techniques is based on 'resource reservation'; for example the Resource Reservation Protocol (RSVP) is widely known in this regard. During connection setup, an RSVP signaling message is sent along the intended data path (and back to the source) to trigger resource reservation in each router along the data path. In other words, before the traffic flow is sent, a particular (requested or available) QoS has to be agreed upon between all involved routers. Only if resource reservation is successful, the flow may be admitted into the network.

As the term 'resource reservation' indicates, RSVP requires per-connection (per-flow) reservation states in each router along the data path. Thus, in large networks a huge number of per-flow states needs to be maintained which requires considerable resources in the routers. Routers within the core part of a transport network (the core nodes) are typically configured for maximum forwarding capacity, i.e. only a limited amount of the processing resources should be spent for traffic management. Therefore, in large networks resource reservation is typically not employed. Instead, some class-based handling may be performed, which is known for example as "DiffServ" (short for "Differentiated Services") handling. According to DiffServ, predetermined traffic classes are provided in the routers. The ingress node (the edge router at the edge of the network, which is the entry point into the network from the point of view of a data stream) marks each packet of an incoming data stream, and the core nodes sort and forward the packet according to the marking. In other words, DiffServ provides QoS on an aggregate basis rather than on a per-flow basis.

With the DiffServ approach, in a congestion situation data packets from many different traffic flows will be discarded. As there is no mechanism to control QoS on a per-flow basis, it is not possible in the network to terminate one or more of the flows in order to resolve congestion and to continue providing full QoS to the remaining flows. In the Internet Engineering Task Force (IETF) project, a lightweight resource reservation protocol has been proposed titled "Resource Management in DiffServ" (RMD) (see the RMD-QoSM draft "draft-ietf-nsis-rmd-12.txt" on the IETF webpage), which is intended to be applicable for large networks. RMD includes a pre-emption function that is able to terminate a number of packet flows as required in order to resolve a congestion situation, and in this way to maintain QoS for the remaining flows. RMD is specified for unicast flows only.

In a PTM transmission such as IP multicast, the content is distributed along a so-called distribution tree. Packets flowing from the sender and reaching a junction point (core node) of the tree are replicated therein to pass on to as many directions as required. Multicast routing protocols are deployed for establishing and possibly refreshing the distribution tree. As one example of such a routing protocol, the Protocol Independent Multicast (PIM) may be mentioned. In the so-called "dense mode" of PIM, the distribution tree is established by firstly flooding the multicast packets to the entire network. Then, in case a router has no subscribers or the same packet is received via multiple interfaces, the router removes itself from the tree. This behavior is called "Flood and Prune". Alternatively, in "sparse mode", PIM relies on pre-established rendezvous points in the network for setting up a distribution tree. A source specific distribution tree is subsequently established by optimizing the paths from the sender to the receivers. The distribution tree between the sender and the rendezvous points will be removed in a last step. In dense mode and in sparse mode, removing the superfluous part of the distribution tree is called 'pruning' and the PIM protocol provides the PIM PRUNE message, which is a signaling message indicating that the part of the distribution tree located at this particular router may be terminated and is to be sent upstream from the router into the direction of the sender.

While there is a general tendency that required bandwidths increase for data applications, this trend may be particularly relevant for present and future multicast applications such as (mobile) TV services, which can be expected to become increasingly important. As such high bit rate flows can cause correspondingly severe congestion situations in the data transport networks, congestion handling for multicast flows is particularly important in PTM-enabled networks.

Network traffic management may provide for an admission control mechanism located at the edge routers of the network acting as ingress nodes. Admission control may ensure that a new flow is blocked at the edge of the network, in this way avoiding congestion situations in the core nodes of the network. However, in case of node or link failure, for example, traffic flows have to be rerouted, and an overload situation may occur along the new route. Even in case of class-based (DiffServ) traffic management within the network, i.e. high-QoS flows such as real-time flows are separated from Best Effort traffic, the link capacities along the new route may not be sufficient. These situations cannot be handled by admission control mechanisms located at the edge of the network.

A known congestion handling for multicast flows in data transport networks relies on the receivers of the flow. These have to be adapted to provide some feedback, e.g. using the Real Time Control Protocol (RTCP), to the sender, wherein the feedback indicates a quality of the received stream. For example, the receivers may report back their perceived loss rate. However, as this kind of congestion control depends on the end application, it is not controllable from a network operator's perspective. Moreover, a large number of receivers may flood the network with their feedback messages. This may be prevented by some damping mechanism, but this in turn leads to a congestion control which may act only on long time scales of the order of minutes, while it would be preferable to have a congestion resolved on typical network timescales, i.e. on timescales of the order of the round trip time (typically some fraction of a second).

Another conventional multicast congestion control approach relies on group membership regulation. Examples are techniques such as Receiver Driven Layered Multicast (RLM) or Receiver-Driven Layered Congestion Control (RLC). Multiple distribution groups have to be provided and receivers may join and leave a particular group using the IGMP protocol, such that each receiver may control its level of participation in a session composed from several multicast groups. However, such mechanisms are very complex.

The RSVP technique may also be used for resource reservation in multicast cases. As it requires maintaining per-flow reservation states in the routers, it can only be applied in networks with a moderate number of flows.

SUMMARY

There is a demand for a technique for traffic handling in a congestion situation in a PTM-enabled network which is operator-controlled, scalable and/or provides for resolving the congestion situation on a short timescale.

This demand is satisfied by a method of traffic handling in congestion situations in a point-to-multipoint ("PTM") enabled network. The method is performed in an egress node of the network and comprises the steps of detecting marked packets, the marking being indicative of a congestion situation in a core node of the PTM-enabled network; selecting, based on the detected markings, a particular PTM flow from one or more PTM flows passing the egress node for termination; and indicating the selected PTM flow in an upstream direction of the selected flow.

The PTM-enabled network may be a broadcast or multicast enabled IP network. A congestion situation may be determined in case a traffic load related to an interface of the core node exceeds a predetermined threshold defined, e.g., for a link, queue or traffic class related to that interface. The egress node may be any node located at the edge of the PTM-enabled network which is a leaving point out of the network from the point of view of a PTM flow or generally a data stream.

The step of detecting the marked packets may be performed without regard to the various interfaces of the egress node. In this case, only a single process may be required in the egress node for the marked packet detection. In another implementation, the step of detecting the marked packets may be performed separately for each of one or more interfaces of the egress node. In this implementation, marked packets from different congested core nodes may be separated from each other because they arrive at the egress node via different interfaces. This may in turn lead to performing the subsequent steps of selecting and indicating a PTM flow for termination separately for each of the detected congestion situations.

The step of selecting a particular PTM flow may comprise determining, based on the marked packets, one or more traffic flows affected by the marking. For example, the headers of the marked packets may be inspected in order to determine the traffic flows the marked packets belong to. Accordingly, the step of selecting the particular PTM flow may comprise determining one or more PTM flows among the one or more traffic flows affected by the marking.

According to one mode, the step of selecting the particular PTM flow may comprise determining, based on the marked packets, an overload level in the congested core node. For example, an overload level may be determined specifically from the marked PTM flows. In this mode, the step of selecting a particular PTM flow may comprise selecting, based on the determined overload level, a particular PTM flow from the one or more PTM flows which have been determined to be affected by the marking. In other words, the determined (e.g., PTM-flow specific) overload level may be used to determine the number of PTM flows to be terminated in order to resolve the congestion situation in the congested core node.

The step of selecting a particular PTM flow may comprise selecting the PTM flow according to a predetermined policy for terminating at least one of unicast flows and PTM flows. For example, the policy may prescribe that PTM flows shall be terminated before terminating PTP flows.

The step of indicating the selected PTM flow may comprise sending a termination indication related to the selected PTM flow in the upstream direction. In particular, the termination indication may comprise a PRUNE message according to the Protocol Independent Multicast ("PIM") standard.

The abovementioned demand is further satisfied by a computer program product, which comprises program code portions for performing any one of the methods described herein when the computer program product is executed on one or more computing devices, for example on one or more egress nodes. The computer program product may be stored on a computer readable recording medium, such as a permanent or re-writeable memory within or associated with a computing device or a removable CD-ROM, DVD or USB-stick. Additionally or alternatively, the computer program product may be provided for download to a computing device, for example via a data network such as the Internet or a communication line such as a telephone line or wireless link.

Further, the abovementioned demand is satisfied by an egress node, for example a router, adapted for traffic handling in congestion situations in a point-to-multipoint ("PTM") enabled network. The egress node comprises a first component adapted to detect marked packets, the marking being indicative of a congestion situation in a core node of the PTM-enabled network; a second component adapted to select, based on the detected markings, a particular PTM flow from one or more PTM flows passing the egress node for termination; and a third component adapted to indicate the selected PTM flow in an upstream direction of the selected flow.

In some variants of the egress node, the first component may be adapted to detect marked packets associated with one of one or more interfaces of the egress node.

Additionally or alternatively, the second component may be adapted to determine, based on the marked packets, one or more PTM flows affected by the marking.

The abovementioned demand is further satisfied by a point-to-multipoint ("PTM") enabled network. The network comprises multiple egress nodes with characteristics as summarized above, wherein in each of the egress nodes the component adapted for selecting a particular PTM flow from one or more PTM flows is identically implemented. The network may further comprise one or more core nodes adapted to forward marked packets received from a congested core node to the multiple egress nodes by identically replicating the marked packets in case the marked packets belong to one or more PTM flows.

BRIEF DESCRIPTION OF THE DRAWINGS

In the following, the invention will further be described with reference to exemplary embodiments illustrated in the figures, in which.

DETAILED DESCRIPTION OF PREFERRED EMBODIMENTS

In the following description, for purposes of explanation and not limitation, specific details are set forth, such as a specific network comprising a particular network topology and particular nodes, in order to provide a thorough understanding of the current invention. It will be apparent to one skilled in the art that the current invention may be practiced in other embodiments that depart from these specific aspects. For example, the skilled artisan will appreciate that the current invention may be practiced in networks different from the IP network described below to illustrate the present invention. This may include any packet-based routed networks existing today or in the future, or may even include switched networks. The techniques described below may not only be applied to a core node-egress node(s) relation, but may be applied to any relationship in a data transport network, in which a node at a particular position in a distribution tree may be subject to a congestion situation (that node is referred to as "core node" in the following) and other nodes downstream the distribution tree may be adapted to help resolving the congestion situation. These latter nodes are referred to as "egress nodes" in the following, although they need not necessarily be located at the egress of the PTM network; the notation "egress node" is based on the fact that the functionality described in detail below may preferably be located downstream at the edge of the PTM network to avoid burdening the core nodes with too much functionality.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the methods disclosed herein when executed by the processor.

Figure 1:
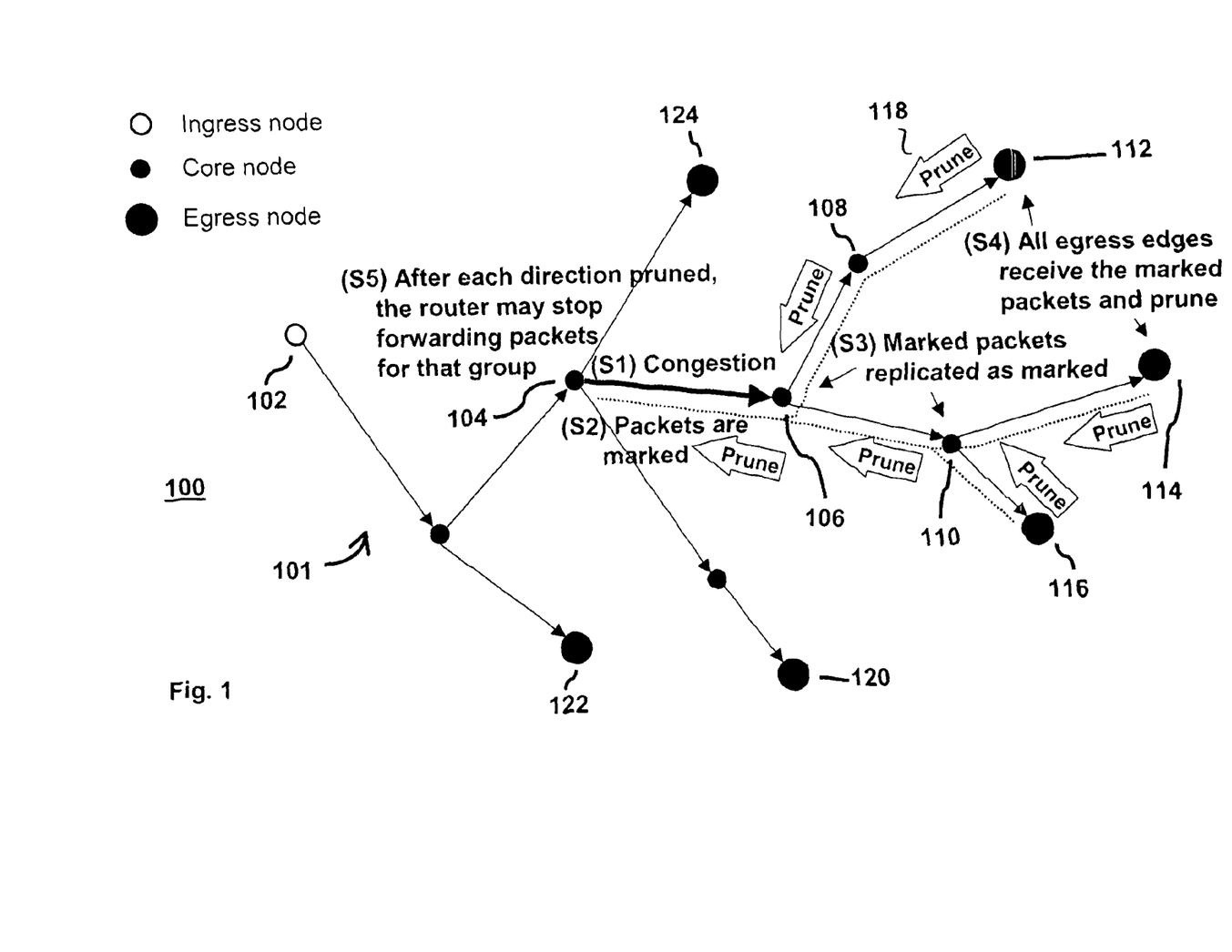
FIG. 1 schematically illustrates an embodiment of a PTM-enabled network with multiple egress nodes adapted to resolve a congestion situation at a core node of the network.

FIG. 1 illustrates an embodiment of a point-multipoint ("PTM") network 100. It will be exemplarily assumed that the network 100 is a data transport network based on the Internet Protocol (IP) protocol suite. FIG. 1 illustrates the distribution tree of a multicast flow generally referenced as flow 101. The distribution tree of flow 101 spreads from a single ingress node 102 (empty circle) over various core nodes (small filled circles) to a plurality of egress nodes (large filled circles). The downstream direction is indicated by the arrows representing the distribution tree of flow 101.

The original sender of the distributed data, which is located upstream of the ingress node 102, is omitted from FIG. 1 for clarity. The sender may, for example, be a TV server providing one or more TV channels to a plurality of receivers (also not shown) downstream of the egress nodes. The receivers may be, e.g., fixed or mobile terminals subscribed to a TV service. While it is assumed that the flow 101 is an IP multicast flow, any other PTM distribution technique such as an IP broadcast or a distribution technique according to the 3GPP ($3^{rd}$ Generation Partnership Project) MBMS (Multimedia Broadcast/Multicast Service) for mobile UMTS networks may as well be used to illustrate the proposed congestion resolution technique.

As illustrated by the thick arrow connecting core nodes 104 and 106, in the core node 104 a congestion situation occurs in the interface connecting the node 104 to the downstream core node 106. The core node 104, based on detecting the congestion situation (S1), performs a marking of packets (S2) to be conveyed via the congested interface, i.e. in the link towards node 106, in order to trigger a termination of flows only downstream to that interface. The core node 104 may, for example, re-use the packet marking mechanism as it is defined in the Resource Management in DiffServ (RMD) protocol. The core node may mark a subset of all packets forwarded via the congested interface such that the number of marked packets multiplied by the packet sizes of that packets results in an indication of the overload in the interface. For example, in case packets carrying an amount of 12 Megabytes (MB) of data are marked within one second (sec), this indicates an overload situation of 12 MB/sec, i.e. the interface may be configured for handling 100 MB/sec, but the actual data amount to be handled is 112 MB/sec. When performing the packet marking, the core node may not distinguish between multicast packets and unicast packets.

Besides the RMD mechanism, any other mechanism may also be used to indicate a measured overload (by proportionally marking leaving packets or in another way) in downstream direction. In general the core node may use any prescription for packet marking, however, the re-use of an already implemented mechanism may save implementation and maintenance efforts.

As illustrated in FIG. 1, the packets marked by the congested core node 104 are forwarded by further core nodes 106, 108 and 110 towards the egress nodes 112, 114 and 116. In the core nodes 106 and 110, which act as junction points for the distribution tree of flow 101, the data packets are replicated (S3) for further distribution along the tree. The replicated packets leaving the nodes 106 and 110 will have the same marking state as the packets received from the congested core node 104, i.e. the marking state of the packets is kept. Therefore each of the egress nodes 112, 114 and 116 receives the same marked/not marked packets. This is of course only true for the packets of the flow 101 illustrated in FIG. 1, and not for unicast packets or multicast packets of flows with different distribution trees.

Upon detection of the marked packets, each of the edge nodes 112, 114 and 116 decides that the flow 101 is to be terminated and sends a PIM PRUNE message 118 upstream in the direction of the congested node 104 (S4). Each of the nodes may decide to terminate other multicast or unicast flows as well (not shown in FIG. 1). The PRUNE message is propagated backwards, i.e. up the distribution tree to the congested node 104.

The coordinated pruning of the portion of the distribution tree towards the egress nodes 112-116 indicates to the congested node 104 that there is no more receiver behind the congested interface towards the core node 106. Therefore, the node 104 can stop forwarding the packets of the flow 101 in this direction (S5), resulting in a decrease of the overload of the interface. In this way, the flow 101 is terminated only towards the edge nodes 112-116, but can be maintained undisturbed in the branches towards the other egress nodes 120, 122 and 124.

In order that the core node 104 can terminate the multicast flow 101, all the edge nodes downstream the congested link must prune the respective group, because as long as there is at least one receiver in the distribution tree downstream the congested link, the packets of the multicast group have to be forwarded down this link. Thus, it is required that the egress nodes 112, 114 and 116 perform a coordinated pruning operation, wherein each of the egress nodes should arrive at the same decision regarding which data flow or flows are to be terminated (e.g., flow 101 in the example of FIG. 1).

Figure 2:
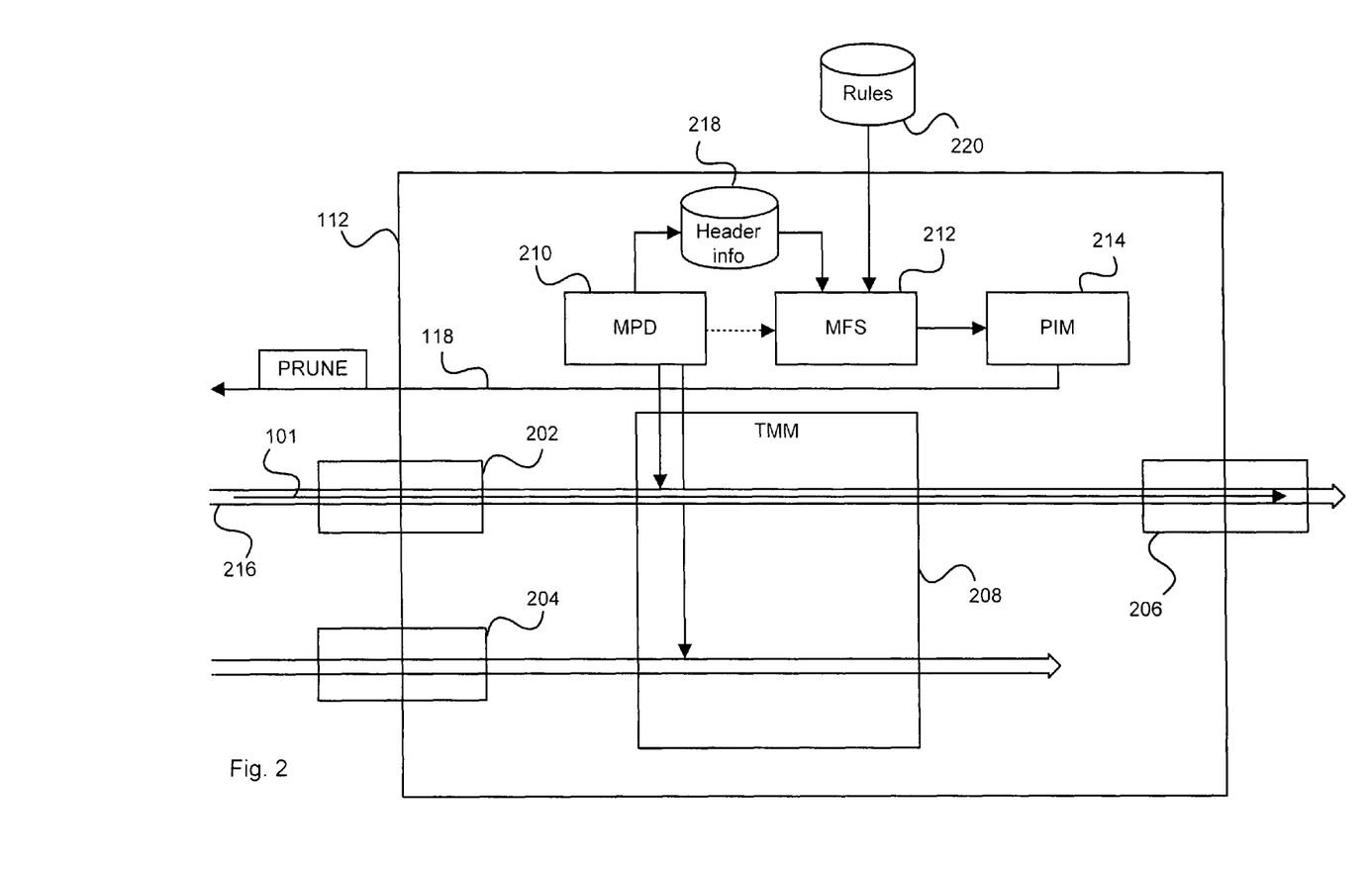
FIG. 2 schematically illustrates functional components of one of the egress nodes of FIG. 1.

FIG. 2 illustrates in more detail functional components of egress node 112 of FIG. 1. Any other of the egress nodes 114-122 of network 100 of FIG. 1 may have a functionality implemented which works similar at least with regard to the below-described decision functionality of which flows are to be terminated in response to the reception of marked packets in the egress node.

The edge node 112 comprises interfaces 202 and 204 connecting the node 112 with the interior of network 100, i.e. core nodes of network 100; in particular it is assumed that the interface 202 connects the edge node 112 with core node 108 (see FIG. 1). Node 112 further comprises an interface 206 connecting the node with other local area or wide area networks. For example, interface 206 may connect to an access network providing receivers access to the TV data flow 101. The edge node 112 further comprises a traffic management module (TMM) 208, a marked package detection (MPD) component 210, a multicast flow selection (MFS) component 212 and a PIM module 214. The components 210-214 are illustrated as being separate from the TMM 208, however, as their operation and interworking is related to traffic handling in the egress node 112, the components 210-214 may also be part of the TMM module 208.

Figure 3:
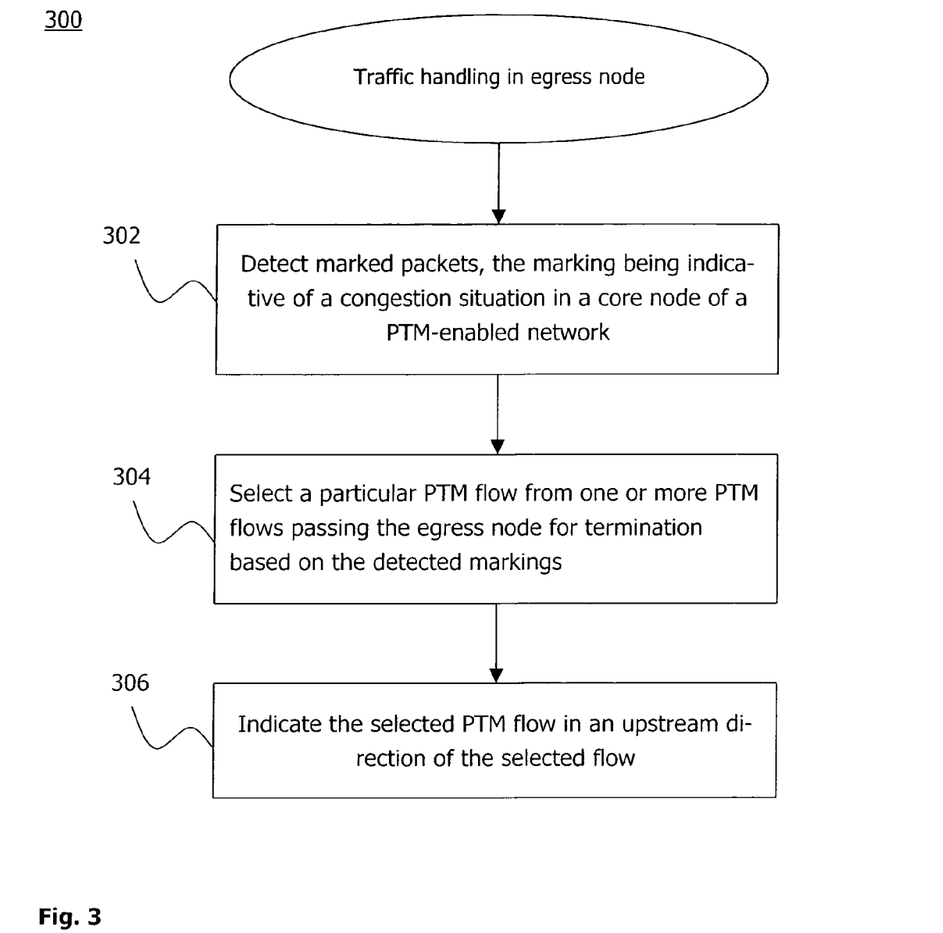
FIG. 3 is a flow diagram illustrating an operation of the egress node of FIG. 2.

An operation of the edge node 112 with regard to traffic handling, i.e. for supporting a resolution of the congestion situation in core node 104 will be described with reference to flow diagram 300 in FIG. 3. In step 302, the MPD component 210 operates to detect marked packets in the incoming data packets 216 received via interface 202. The data packets 216 may comprise any kind of data packets conveyed via network 100, and in particular comprises the packets transporting the multicast data flow 101 from FIG. 1. The MPD component 210 may monitor each of the incoming packets 216 whether it carries a marking indicative for a congestion situation in the network 100. In case such a marking is detected, the component 210 may determine particular information, e.g., from the header fields of the incoming marked packets. For example, for each packet a packet size of the marked packet, and additionally some address information may be read out. The address information may comprise at least one of a source address, a destination address and a port number.

The component 210 stores the read out data in a storage component 218. The congestion determination is performed based on a counting interval, wherein the counting interval may, for example, be of the order of a typical round trip time in the network 100. Thus, information on all marked packets received via the interface 202 during the predetermined counting interval has to be stored in storage 218. For example, the buffer 218 may be overwritten in a cyclical fashion by the MPD component 210.

As indicated in FIG. 2, the component 210 may operate on a per-interface basis, i.e. the component 210 detects marked packets separately for each of the interfaces 202 and 204 connecting to the network 100, and may also store the detected data in buffer 218 such that a congestion determination may be performed independently for each of the interfaces 202 and 204.

In step 304, the MFS component 212 operates to select, based on the detected markings, one or more particular multicast flows from the one or more multicast flows passing the egress node 112 for termination. The MFS component may be triggered by the MPD component 210, as indicated by the dashed arrow in FIG. 2, or may operate on a periodical basis on the information stored in buffer 218. As said above, the component 212 operates on a per-interface basis, i.e. a detection of flows to be terminated is performed independently for each of the interfaces 202 and 204. With regard to interface 202, the component 212 accesses the respective information stored in buffer 218, i.e. the header data of the detected marked packets (this includes in particular the header data of the detected marked packets of the multicast flow 101).

The component 212 determines per counting interval whether marked packets have been received at all. Should this be the case, the MFS component 212 determines from the address information stored in buffer 218 that flows (from all flows incoming via interface 202) which have been marked. Moreover, the MFS component determines the type of the flows affected by the marking, i.e. whether the marked flows are unicast flows or multicast flows. The reason for this is discussed further below.

The component 212 adds together the packet sizes stored for the current counting interval and belonging to the marked unicast flows and determines in this way the amount of overload related to unicast flows. Similarly, a multicast-related overload is determined. Assuming exemplarily that in the current counting interval only packets marked by the congested core node 104 have been received via interface 202, the sum of the marked packet sizes per counting interval may for example be 2 MB/sec for unicast flows and 5 MB/sec for multicast flows.

In this respect, it is to be noted that the overload indicated by the congested core node 104 via its congested interface will in general be larger than the total overload (i.e. the sum of unicast overload and multicast overload) determined by the edge node 112, as not all data paths leaving the core node 104 extend over the egress node 112. Thus, while the core node 104 may indicate a total overload of 12 MB/sec, only 7 MB/sec may be detected by the edge node 112. Nevertheless, the egress node 112 may support a resolution of the congestion situation at the core node 104 by up to the total overload amount determined in node 112.

Eventually, the MFS component 212 may separately select a number of unicast flows and a number of multicast flows for termination, such that the summed data volume of the unicast flows and of the multicast flows each reaches the respective determined overload volume of unicast/multicast traffic.

With regard to the multicast flows, after having selected one or more multicast flows for termination, the MFS component 212 triggers the PIM module 214 which in response to the trigger operates in step 306 to indicate the selected multicast flow(s) upstream towards the congested node 104 by sending a PIM PRUNE message 118 (see also FIG. 1). A single message may be sent indicating all multicast flows to be terminated or, in the alternative, one message for each multicast flow to be terminated may be sent. The latter approach may be preferred, as this is the behaviour specified in PIM.

The above-mentioned aspect that the MFS component 212 should distinguish between marked unicast and multicast flows follows from the fact that each egress node in the distribution branch downstream the congested core node must select identically the same multicast flow(s) for termination, as otherwise the core node cannot terminate the forwarding of the multicast flow in this direction.

Consider a scenario in which the egress node 112 indicates to terminate flow 101 (as illustrated in the figures), but another egress node (e.g. one of the nodes 114 or 116 in FIG. 1) decide to terminate a number of unicast connections instead. In this case, no pruning messages from this branch would arrive at the congested node for the multicast flow 101. Thus, egress node 112 cannot terminate the multicast flow 101. As a result, preferably unicast connections will be terminated, while multicast distributions will tend to be continued, although the multicast flows may contribute most to the congestion situation because of large bandwidth consumption. Any policy implementing a priority for unicast/multicast flows thus requires that the flow selection in the egress nodes is unicast/multicast aware.

Moreover, an egress node may also not substitute marked multicast flows for marked unicast flows. This is because other edge nodes most probably have received marked unicast flows indicating a different overload amount or have even not received any marked unicast flows. Thus, the other edge nodes would determine a different overload situation and would probably come to a different decision on which flows to terminate. In particular, a common decision regarding the one or more multicast flows would most probably not be found. In the extreme, again only unicast connections would be terminated, which might not be sufficient to resolve the congestion situation.

Coordinated pruning is thus required for all egress nodes in the distribution branch downstream the congested link of the congested core node. Each egress node must select identically the same multicast flow(s) for termination. This behaviour may be implemented by ensuring that identical rules for flow selection are applied in each egress node. In case the marked packets are identically replicated within the network 100, the same overload indication is received in each of the egress nodes; thus identical rules lead to identical decisions. Referring to FIG. 2, such rules may be stored in a storage component 226, which may be a storage component associated with the edge node 112, or may be located remote from the edge node 112 and may be accessed by all edge nodes 112-116 and 120-124 of network 100. This would automatically enforce that each of the edge nodes applies one and the same policy for terminating multicast flows.

The policy rules may indicate, for example, termination priorities. As a concrete example, a policy rule may prescribe that preferably multicast flows have to be terminated before unicast connections. The rules may even prefer particular multicast streams over others, e.g. certain TV channels may be preferred over other TV channels in case of network congestion. As another example, a policy rule may comprise to select flows with the highest (lowest) group address first.

The above-described technique for resolving a congestion situation may be applied alone or in parallel to other congestion handling techniques, for example a conventional re-adaptation technique. For example, re-adaptation may be applied at first instance and the above-described congestion handling may be applied in case re-adaptation is not sufficient to resolve a congestion situation in the network.

The proposed technique may be applied, for example, in access networks and in native IP core networks. The proposed technique may be applied, amongst others, in any meshed network, in which a routing protocol or similar mechanism is used to switch to an alternative route in case network topology or load conditions change.

The technique proposed herein enables the efficient resolution of congestion situations in PTM-enabled data transport networks. No or minor modifications of core nodes are required; only the edge nodes (egress nodes from a data flow perspective) require enhanced traffic handling functionality to initiate pruning based on the reception of marked multicast packets. Only the affected sub-branch of the distribution tree is pruned. The proposed techniques are operator-driven, i.e. the transport network operator handles the congestion instead of some end applications.

The above-described congestion handling technique resolves congestion within the order of a round trip time plus the time required in the edge node to detect an overload situation. Terminating flows in case of congestion in this way is a very fast approach to overcome a congestion situation and will typically be seamless for the remaining flows. Other solutions may be applied to solve the congestion on longer time scales, e.g. via a re-configuration.

In case marked packets are counted in a per-incoming interface manner, packets from multiple congested nodes may be separated based on the different incoming interfaces. This enables the parallel resolution of multiple congestion situations.

With the proposed technique, redundancy requirements can efficiently be fulfilled. While normally a full redundancy means that all links and nodes are to be protected one-by-one, when applying the above-described technique the link and node capacities need not necessarily be doubled. Instead, the proposed technique is used to maintain the same QoS as if all links and nodes would be fully protected.

While the current invention has been described in relation to its preferred embodiments, it is to be understood that this description is for illustrative purposes only. Accordingly, it is intended that the invention be limited only by the scope of the claims appended hereto.

The invention claimed is:

1. A method of traffic handling in congestion situations in a point-to-multipoint ("PTM") enabled network, the method being performed in an egress node of the network and comprising the steps of:

detecting marked packets, the marking being indicative of a congestion situation in a core node of the PTM-enabled network;

distinguishing between marked packets belonging to a unicast flow and marked packets belonging to a multicast flow;

selecting, based on the detected markings and based on the distinguishing between unicast and multicast flows, a particular PTM flow from one or more PTM flows passing the egress node for termination; and indicating the selected PTM flow in an upstream direction of the selected flow.

2. The method according to claim 1, wherein the step of detecting the marked packets is performed separately for each of one or more interfaces of the egress node.

3. The method according to claim 1, wherein the step of selecting a particular PTM flow comprises determining, based on the detected marked packets, one or more traffic flows affected by the marking.

4. The method according to claim 3, wherein the step of selecting the particular PTM flow comprises determining one or more PTM flows among the one or more traffic flows affected by the marking.

5. The method according to claim 4, wherein the step of selecting a particular PTM flow comprises selecting, based on the determined overload level, a particular PTM flow from the one or more PTM flows which have been determined to be affected by the marking.

6. The method according to claim 1, wherein the step of selecting the particular PTM flow comprises determining, based on the marked packets, an overload level.

7. The method according to claim 1, wherein the step of indicating the selected PTM flow comprises sending a termination indication related to the selected PTM flow in the upstream direction.

8. The method according to claim 7, wherein the termination indication, according to the Protocol Independent Multicast ("PIM") standard, comprises a PIM prune message.

9. An egress node adapted for traffic handling in congestion situations in a point-to-multipoint ("PTM") enabled network, comprising:
- a first component adapted to detect marked packets, the marking being indicative of a congestion situation in a first core node of the PTM-enabled network;
- a second component adapted to distinguish between marked packets belonging to a unicast flow and marked packets belonging to a multicast flow and adapted to select, based on the detected markings and based on the distinguishing between unicast and multicast flows, a particular PTM flow from one or more PTM flows passing the egress node for termination; and
- a third component adapted to indicate the selected PTM flow in an upstream direction of the selected flow.

10. The egress node according to claim 9, wherein the first component is adapted to detect marked packets associated with one of one or more interfaces of the egress node.

11. The egress node according to claim 9, wherein the second component is adapted to determine, based on the marked packets, one or more PTM flows affected by the marking.

12. A point-to-multipoint ("PTM") enabled network, comprising multiple egress nodes wherein in each of the egress nodes a component adapted for selecting a particular PTM flow from one or more PTM flows is identically implemented, each egress node comprising:
- a first component adapted to detect marked packets, the marking being indicative of a congestion situation in a first core node of the PTM-enabled network;
- a second component adapted to distinguish between marked packets belonging to a unicast flow and marked packets belonging to a multicast flow and adapted to select, based on the detected markings and based on the distinguishing between unicast and multicast flows, a particular PTM flow from one or more PTM flows passing the egress node for termination; and
- a third component adapted to indicate the selected PTM flow in an upstream direction of the selected flow.

13. The PTM-enabled network according to claim 12, further comprising one or more second core nodes adapted to forward marked packets received from the congested first core node to the one or more egress nodes by identically replicating the marked packets in case the marked packets belong to one or more PTM flows.

* * * * *

UNITED STATES PATENT AND TRADEMARK OFFICE
CERTIFICATE OF CORRECTION

PATENT NO. : 8,503,303 B2
APPLICATION NO. : 12/989705
DATED : August 6, 2013
INVENTOR(S) : Csaszar et al.

Page 1 of 1

It is certified that error appears in the above-identified patent and that said Letters Patent is hereby corrected as shown below:

On the Title Page, in Item (56), under "OTHER PUBLICATIONS", in Column 2, Line 4, delete "Scence;;" and insert -- Science; --, therefor.

In the Specification

In Column 1, Line 55, delete "("PIP")" and insert -- ("PTP") --, therefor.

Signed and Sealed this
Thirty-first Day of December, 2013

Margaret A. Focarino
*Commissioner for Patents of the United States Patent and Trademark Office*